(12) United States Patent
Eichenauer et al.

(10) Patent No.: US 6,767,962 B2
(45) Date of Patent: Jul. 27, 2004

(54) POLYMER COMPOSITIONS HAVING IMPROVED CONSTANCY OF PROPERTIES

(75) Inventors: Herbert Eichenauer, Dormagen (DE); Vera Buchholz, Köln (DE); Eckhard Wenz, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 8 days.

(21) Appl. No.: 10/206,638

(22) Filed: Jul. 26, 2002

(65) Prior Publication Data

US 2003/0055165 A1 Mar. 20, 2003

(30) Foreign Application Priority Data

Aug. 2, 2001 (DE) ......................................... 101 37 782

(51) Int. Cl.⁷ .............................................. C08L 51/00
(52) U.S. Cl. ............................ 525/63; 525/66; 525/67; 525/71; 525/78; 525/86; 525/87
(58) Field of Search .............................. 525/63, 66, 67, 525/71, 78, 86, 87

(56) References Cited

U.S. PATENT DOCUMENTS

| | | | |
|---|---|---|---|
| 4,713,420 A | * 12/1987 | Henton | 525/236 |
| 4,714,671 A | * 12/1987 | Helling et al. | 430/545 |
| 5,674,940 A | 10/1997 | Eichenauer et al. | 525/71 |
| 5,955,540 A | * 9/1999 | Dion et al. | 525/71 |

FOREIGN PATENT DOCUMENTS

| | | |
|---|---|---|
| CA | 2337390 | 1/2000 |
| EP | 0 007 810 | 2/1980 |

* cited by examiner

*Primary Examiner*—Jeffrey Mullis
(74) *Attorney, Agent, or Firm*—Joseph C. Gil; Gary F. Matz; Aron Preis

(57) ABSTRACT

A thermoplastic molding composition that contains a plurality of graft rubbers is disclosed. A first graft rubber is a product of emulsion polymerization of a mixture containing styrene and acrylonitrile in the presence of butadiene polymer latex (A) having an average particle diameter ($d_{50}$) of 80 to 220 nm. An additional graft rubber is a product of emulsion polymerization of a mixture containing styrene and acrylonitrile in the presence of butadiene polymer latex (B) having an average particle diameter ($d_{50}$) of 350 to 650 nm. The butadiene polymer latex (A) is the product of seed polymerization in which seed is butadiene polymer latex having a median particle diameter of 10 to 100 nm, and the butadiene polymer latex (B) is the product of agglomeration in which butadiene polymer latex (A) is the starting latex.

13 Claims, No Drawings

POLYMER COMPOSITIONS HAVING IMPROVED CONSTANCY OF PROPERTIES

FIELD OF THE INVENTION

The invention relates to thermoplastic molding compositions and more particularly to compositions containing graft rubbers.

SUMMARY OF THE INVENTION

A thermoplastic molding composition that contains a plurality of graft rubbers is disclosed. A first graft rubber is a product of emulsion polymerization of a mixture containing styrene and acrylonitrile in the presence of butadiene polymer latex (A) having an average particle diameter ($d_{50}$) of 80 to 220 nm. An additional graft rubber is a product of emulsion polymerization of a mixture containing styrene and acrylonitrile in the presence of butadiene polymer latex (B) having an average particle diameter ($d_{50}$) of 350 to 650 nm. The butadiene polymer latex (A) is the product of seed polymerization in which seed is butadiene polymer latex having a median particle diameter of 10 to 100 nm, and the butadiene polymer latex (B) is the product of agglomeration in which butadiene polymer latex (A) is the starting latex.

BACKGROUND OF THE INVENTION

ABS molding compositions or molding compositions of the ABS type have for many years been used in large amounts as thermoplastic resins for the production of moldings of all kinds. The spectrum of properties of such resins can be varied within a wide range.

Particularly important properties of ABS molding compositions that may be mentioned are strength (impact strength, notched bar impact strength), modulus of elasticity, processability (MVR), dimensional stability under heat, surface gloss, defined combinations of properties generally being of importance depending on the field of use.

A particularly important feature for the processor of ABS molding compositions, especially where fully automated production plants are being used, is the constancy of properties or combinations of properties of the molding compositions to be processed.

Although it is possible by using modern processes in ABS production (e.g. computer-controlled polymerization and compounding) to produce products having relatively narrow tolerance limits, special applications require an even higher constancy of properties, which can be achieved only via the product composition or product structure.

The object was, therefore, to produce thermoplastic molding compositions of the ABS type that exhibit a very constant profile of properties. In particular, that was to be achieved for products having a very high surface gloss.

DETAILED DESCRIPTION OF THE INVENTION

The object according to the invention is achieved by the use of combinations of two graft rubber polymers in the production of which, using butadiene polymer seed latex particles having defined particle diameters, there is used rubber having a defined particle diameter and obtained by seed polymerization.

The invention provides thermoplastic molding compositions containing

I) at least one graft rubber polymer obtained by emulsion polymerization of styrene and acrylonitrile in a weight ratio of from 95:5 to 50:50, it being possible for styrene and/or acrylonitrile to be replaced wholly or partially by α-methylstyrene, methyl methacrylate or N-phenylmaleimide or mixtures thereof, in the presence of at least one butadiene polymer latex (A) having an average particle diameter ($d_{50}$) of from 80 to 220 nm, preferably from 90 to 210 nm and particularly preferably from 100 to 200 nm, II) at least one graft rubber polymer obtained by emulsion polymerization of styrene and acrylonitrile in a weight ratio of from 95:5 to 50:50, it being possible for styrene and/or acrylonitrile to be replaced wholly or partially by α-methylstyrene, methyl methacrylate or N-phenylmaleimide or mixtures thereof, in the presence of at least one butadiene polymer latex (B) having an average particle diameter ($d_{50}$) of from 350 to 650 nm, preferably from 360 to 600 nm, particularly preferably from 380 to 550 nm and most particularly preferably from 390 to 500 nm, III) at least one rubber-free copolymer of styrene and acrylonitrile in a weight ratio of from 95:5 to 50:50, it being possible for styrene and/or acrylonitrile to be replaced wholly or partially by (α-methylstyrene, methyl methacrylate or N-phenylmaleimide or mixtures thereof, which polymer compositions are characterised in that the butadiene polymer latex (A) has been obtained by seed polymerization using a butadiene polymer seed latex having an average particle diameter of from 10 to 100 nm, preferably from 20 to 90 nm and particularly preferably from 30 to 80 nm, and the butadiene polymer latex (B) has been obtained by agglomeration using butadiene polymer latex (A) as the starting latex.

The present invention also provides a process for the production of the polymer compositions according to the invention, wherein the butadiene polymer latex (A) is obtained by seed polymerization using a butadiene polymer seed latex having a median particle diameter of from 10 to 100 nm, and the butadiene polymer latex (B) is obtained by agglomeration using butadiene polymer latex (A) as the starting latex.

In general, the polymer compositions according to the invention may contain the graft rubber components (I)+(II) in amounts of from 1 to 60 parts by weight, preferably from 5 to 50 parts by weight, and the rubber-free resin component (III) in amounts of from 40 to 99 parts by weight, preferably from 50 to 95 parts by weight.

The weight ratio (I):(II) may be varied within wide limits; it is usually from 90:10 to 10:90, preferably from 80:20 to 30:70 and particularly preferably from 70:30 to 40:60.

In addition to the mentioned polymer components, the polymer compositions according to the invention may contain further rubber-free thermoplastic resins not composed of vinyl monomers, such thermoplastic resins being used in amounts of up to 1000 parts by weight, preferably up to 700 parts by weight and particularly preferably up to 500 parts by weight (in each case based on 100 parts by weight of I+II+III).

The butadiene polymer latex (A) is prepared by emulsion polymerization of butadiene according to the so-called seed polymerization technique, in which a finely divided butadiene polymer is first prepared in the form of a seed latex and is then polymerized further to larger particles by further reaction with monomers containing butadiene (see, for example, Houben-Weyl, Methoden der Organischen Chemie, Makromolekulare Stoffe, Part 1, p. 339 (1961), Thieme Verlag Stuttgart). The operation is preferably carried out using the seed batch process or using the seed feed process.

There may be used as comonomers up to 50 wt. % (based on the total amount of monomers used to prepare the butadiene polymer) of one or more monomers that are copolymerizable with butadiene.

Examples of such monomers are isoprene, chloroprene, acrylonitrile, styrene, α-methylstyrene, C1–C4-alkylstyrenes, C1–C8-alkyl acrylates, C1–C8-alkyl methacrylates, alkylene glycol diacrylates, alkylene glycol dimethacrylates, divinylbenzene; preference is given to the use of butadiene alone or in admixture with up to 20 wt. %, preferably with up to 10 wt. %, styrene and/or acrylonitrile.

As seed latex polymers there are preferably used butadiene polymers such as, for example, polybutadiene, butadiene/styrene copolymers, butadiene/acrylonitrile copolymers, or polymers of the above-mentioned monomers.

Preferred seed latex polymers are polybutadiene latexes.

In the preparation of the butadiene polymer latex (A) there is used a seed latex having an average particle diameter $d_{50}$ of from 10 to 100 nm, preferably from 20 to 90 nm and particularly preferably from 30 to 80 nm.

In the preparation of the butadiene polymer latex (B), the butadiene polymer latex (A) is used as the starting latex.

The seed latex for the preparation of the butadiene polymer (A) has a gel content of from 10 to 95 wt. %, preferably from 20 to 90 wt. % and particularly preferably from 30 to 85 wt. %.

The butadiene polymer latex (A) has an average particle diameter $d_{50}$ of from 80 to 220 nm, preferably from 90 to 210 nm and particularly preferably from 100 to 200 nm.

The gel content of (A) is from 30 to 98 wt. %, preferably from 40 to 95 wt. % and particularly preferably from 50 to 92 wt. %.

The butadiene polymer latex (B) has a median particle diameter d50 of from 350 to 650 nm, preferably from 360 to 600 nm and particularly preferably from 380 to 550 nm and most particularly preferably from 390 to 500 nm.

The gel content of (B) is from 30 to 98 wt. %, preferably from 40 to 95 wt. % and particularly preferably from 50 to 92 wt. %.

The butadiene polymer latex (B) is prepared by agglomeration from the butadiene polymer latex (A) obtained by seed polymerization, or from mixtures of various butadiene polymer latexes (A). The conventional processes known for carrying out the agglomeration may be used.

For example, mention may be made of agglomeration by the action of chemicals such as, for example, acetic anhydride (see, for example, U.S. Pat. No. 3,558,541, EP-A 7810 and literature cited therein) or acrylate-containing mixed polymer dispersions (see DE-A 17 20 058), by the action of mechanical forces under pressure in a nozzle (see, for example, DE-A 12 33 131), or by pronounced cooling of the latex (see, for example, GB-A 758 622).

The preferred process for the preparation of the butadiene polymer latex (B) is chemical agglomeration using acetic anhydride.

The average particle diameter $d_{50}$ may be determined by ultracentrifuge measurement (see W. Scholtan, H. Lange: Kolloid Z. u. Z. Polymere 250, p. 782 to 796 (1972)); the values indicated for the gel content relate to the determination according to the wire cage method in toluene (see Houben-Weyl, Methoden der Organischen Chemie, Makromolekulare Stoffe, Part 1, p. 307 (1961), Thieme Verlag Stuttgart).

The gel contents of the butadiene polymer latex (A) (and hence also of the butadiene polymer latex (B)) and of the butadiene polymer seed latex for the preparation of the butadiene polymer latex (A) may be adjusted in a manner that is known in principle by the use of suitable reaction conditions (e.g. a high reaction temperature and/or polymerization to a high conversion, as well as the optional addition of substances having a crosslinking action, in order to achieve a high gel content, or, for example, a low reaction temperature and/or termination of the polymerization reaction before the degree of crosslinking becomes too great, as well as the optional addition of molecular-weight regulators, such as, for example, n-dodecylmercaptan or tert-dodecylmercaptan, in order to achieve a low gel content). As emulsifier there may be used conventional anionic emulsifiers such as alkyl sulfates, alkyl sulfonates, aralkyl sulfonates, soaps of saturated or unsaturated fatty acids as well as of alkaline disproportionated or hydrogenated abietic or talloleic acids. It is also possible in principle to use emulsifiers having carboxyl groups (e.g. salts of C10–C18 fatty acids, disproportionated abietic acid, emulsifiers according to DE-A 36 39 904 and DE-A 39 13 509).

The preparation of the graft rubber polymers (I) and (II) may be carried out, as desired, by separate grafting of the butadiene polymer latexes (A) and (B) in separate reactions or by the common grafting of a mixture of the butadiene polymer latexes (A) and (B) during one reaction, with preference being given to the separate grafting of the butadiene polymer latexes (A) and (B) in separate reactions.

The graft polymerization(s) may be carried out according to any desired processes; it/they is/are preferably so carried out that the monomer mixture is added continuously to the butadiene polymer latex (A) or to the butadiene polymer latex (B) or to a mixture of butadiene polymer latexes (A) and (B), and polymerization is carried out.

Particular monomer/rubber ratios are preferably maintained, and the monomers are added to the rubber in a known manner:

In order to produce components (I) and (II) according to the invention, preferably from 15 to 60 parts by weight, particularly preferably from 20 to 50 parts by weight, of a mixture of styrene and acrylonitrile, which may optionally contain up to 50 wt. % (based on the total amount of monomers used in the graft polymerization) of one or more comonomers, are polymerized in the presence of preferably from 40 to 85 parts by weight, particularly preferably from 50 to 80 parts by weight (in each case based on solid), of the butadiene polymer latex (A) or of the butadiene polymer latex (B) or of a mixture of butadiene polymer latexes (A) and (B).

The rubber contents of the graft rubber polymers (I) and (II) preferably differ in such a manner that the rubber content of (II) is higher than that of (I) by $\geqq 2$ wt. %, preferably $\geqq 5$ wt. %.

The monomers used in the graft polymerization are preferably mixtures of styrene and acrylonitrile in a weight ratio of from 95:5 to 50:50, particularly preferably in a weight ratio of from 80:20 to 65:35, it being possible for styrene and/or acrylonitrile to be replaced wholly or partially by copolymerizable monomers, preferably by α-methylstyrene, methyl methacrylate or N-phenylmaleimide. In principle, any desired further copolymerizable vinyl monomers may additionally be used concomitantly in amounts of up to approximately 10 wt. % (based on the total amount of monomers).

Molecular-weight regulators may additionally be used in the graft polymerization, preferably in amounts of from 0.01 to 2 wt. %, particularly preferably in amounts of from 0.05 to 1 wt. % (in each case based on the total amount of monomers in the graft polymerization step).

Suitable molecular-weight regulators are, for example, alkylmercaptans, such as n-dodecylmercaptan, tert-dodecylmercaptan; dimeric α-methylstyrene; terpinols.

Included as initiators are inorganic and organic peroxides, for example H2O2, di-tert-butyl peroxide, cumene hydroperoxide, dicyclohexyl percarbonate, tert-butyl hydroperoxide, p-menthane hydroperoxide, azo initiators such as azobisisobutyronitrile, inorganic per-salts such as ammonium, sodium or potassium persulfate, potassium perphosphate, sodium perborate, as well as redox systems. Redox systems generally consist of an organic oxidising agent and a reducing agent, it being possible for heavy metal ions additionally to be present in the reaction medium (see Houben-Weyl, Methoden der Organischen Chemie, Volume 14/1, p. 263 to 297).

The polymerization temperature is generally from 25° C. to 160° C., preferably from 40° C. to 90° C. Suitable emulsifiers are mentioned above.

The operation may be carried out with conventional temperature management, for example isothermally; however, the graft polymerization is preferably carried out in such a manner that the temperature difference between the beginning and the end of the reaction is at least 10° C., preferably at least 15° C. and particularly preferably at least 20° C.

In order to produce components I) and II) according to the invention, the graft polymerization may preferably be carried out by feeding in the monomers in such a manner that from 55 to 90 wt. %, preferably from 60 to 80 wt. % and particularly preferably from 65 to 75 wt. %, of the total monomers to be used in the graft polymerization are metered in in the first half of the total monomer metering time; the remaining amount of monomers is metered in in the second half of the total monomer metering time.

There are used as the rubber-free copolymers III) preferably copolymers of styrene and acrylonitrile in a weight ratio of from 95:5 to 50:50, it being possible for styrene and/or acrylonitrile to be replaced wholly or partially by α-methylstyrene, methyl methacrylate or N-phenylmaleimide.

Particular preference is given to copolymers III) having contents of incorporated acrylonitrile units <30 wt. %.

Such copolymers preferably have weight average molecular weights $\overline{M}_W$ of from 20,000 to 200,000 and limiting viscosities [η] of from 20 to 110 ml/g (measured in dimethylformamide at 25° C.).

Details relating to the preparation of such resins are described, for example, in DE-A 2 420 358 and DE-A 2 724 360. Such vinyl resins prepared by mass or solution polymerization have proved to be particularly suitable. The copolymers may be added alone or in any desired mixture.

In addition to thermoplastic resins composed of vinyl monomers, it is also possible to use polycondensation products, for example aromatic polycarbonates, aromatic polyester carbonates, polyesters, polyamides, as the rubber-free copolymer in the molding compositions according to the invention.

Suitable thermoplastic polycarbonates and polyester carbonates are known (see, for example, DE-A 1 495 626, DE-A 2 232 877, DE-A 2 703 376, DE-A 2 714 544, DE-A 3 000 610, DE-A 3 832 396, DE-A 3 077 934), for example which may be prepared by reaction of diphenols of formulae (IV) and (V)

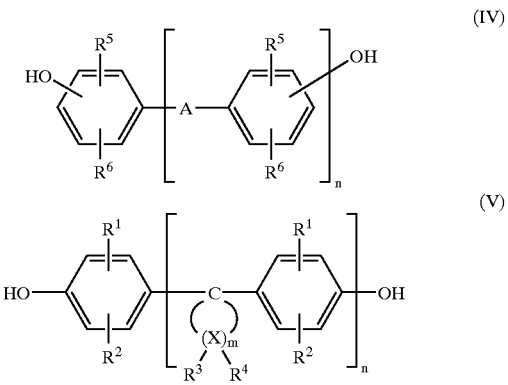

wherein
- A is a single bond, C1–C5-alkylene, C2–C5-alkylidene, C5–C6-cycloalkylidene, —O—, —S—, —SO—, —SO2- or —CO—,
- R5 and R6 each independently of the other represents hydrogen, methyl or halogen, especially hydrogen, methyl, chlorine or bromine,
- R1 and R2 each independently of the other represents hydrogen, halogen, preferably chlorine or bromine, C1–C8-alkyl, preferably methyl, ethyl, C5–C6-cycloalkyl, preferably cyclohexyl, C6–C10-aryl, preferably phenyl, or C7–C12-aralkyl, preferably phenyl-C1–C4-alkyl, especially benzyl,
- m is an integer from 4 to 7, preferably 4 or 5,
- n is 0 or 1,
- R3 and R4 is selected individually for each X and each independently of the other represents hydrogen or C1–C6-alkyl, and
- X represents carbon, with carbonic acid halides, preferably phosgene, and/or with aromatic dicarboxylic acid dihalides, preferably benzenedicarboxylic acid dihalides, by interfacial polycondensation, or with phosgene by polycondensation in homogeneous phase (the so-called pyridine process), wherein the molecular weight may be adjusted in a known manner by an appropriate amount of known chain terminators.

Suitable diphenols of formulae (IV) and (V) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of formula (IV) are 2,2-bis-(4-hydroxyphenyl)-propane and 1,1-bis-(4-hydroxyphenyl)-cyclohexane, and the preferred phenol of formula (V) is 1,1-bis-(4-hydroxyphenyl)-3,3,5-trimethylcyclohexane.

It is also possible to use mixtures of diphenols.

Suitable chain terminators are, for example, phenol, p-tert-butylphenol, long-chain alkylphenols such as 4-(1,3-tetramethylbutyl)phenol according to DE-A 2 842 005, monoalkylphenols, dialkylphenols having a total of from 8 to 20 carbon atoms in the alkyl substituents according to DE-A 3 506 472, such as p-nonylphenol, 2,5-di-tertbutylphenol, p-tert-octylphenol, p-dodecylphenol, 2-(3,5-dimethylheptyl)-phenol and 4-(3,5-dimethylheptyl)-phenol. The amount of chain terminators required is generally from 0.5 to 10 mol %, based on the sum of the diphenols (IV) and (V).

The polycarbonates or polyester carbonates that are suitable may be linear or branched; branched products are preferably obtained by incorporation of from 0.05 to 2.0 mol %, based on the sum of the diphenols used, of compounds having a functionality of three or more than three, for example compounds having three or more than three phenolic OH groups.

The polycarbonates or polyester carbonates that are suitable may contain aromatically bonded halogen, preferably bromine and/or chlorine; preferably, they are halogen-free.

They have molecular weights ($\overline{M}_W$, weight-average), determined, for example, by ultracentrifugation or scattered light measurement, of from 10,000 to 200,000, preferably from 20,000 to 80,000.

Suitable thermoplastic polyesters are preferably polyalkylene terephthalates, that is to say reaction products of aromatic dicarboxylic acids or reactive derivatives thereof (e.g. dimethyl esters or anhydrides) and aliphatic, cycloaliphatic or arylaliphatic diols, and mixtures of such reaction products.

Preferred polyalkylene terephthalates may be prepared from terephthalic acids (or reactive derivatives thereof) and aliphatic or cycloaliphatic diols having from 2 to 10 carbon atoms according to known methods (Kunststoff-Handbuch, Volume VIII, p. 695 ff, Carl Hanser Verlag, Munich 1973).

In preferred polyalkylene terephthalates, from 80 to 100 mol %, preferably from 90 to 100 mol %, of the dicarboxylic acid radicals are terephthalic acid radicals, and from 80 to 100 mol %, preferably from 90 to 100 mol %, of the diol radicals are ethylene glycol and/or 1,4-butanediol radicals.

The preferred polyalkylene terephthalates may contain, in addition to ethylene glycol or 1,4-butanediol radicals, from 0 to 20 mol % of radicals of other aliphatic diols having from 3 to 12 carbon atoms or cycloaliphatic diols having from 6 to 12 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy)-benzene, 2,2(bis-4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, 2 407 776, 2 715 932).

The polyalkylene terephthalates may be branched by incorporation of relatively small amounts of tri- or tetra-hydric alcohols or tri- or tetra-basic carboxylic acids, such as are described in DE-A 1 900 270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component.

Particular preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Preferred polyalkylene terephthalates are also copolyesters prepared from at least two of the above-mentioned alcohol components: particularly preferred copolyesters are poly-(ethylene glycol 1,4-butanediol) terephthalates.

The polyalkylene terephthalates that preferably suitable generally have an intrinsic viscosity of from 0.4 to 1.5 dl/g, preferably from 0.5 to 1.3 dl/g, especially from 0.6 to 1.2 dl/g, in each case measured in phenol/o-dichlorobenzene (1:1 parts by weight) at 25° C.

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known.

Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams.

Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine.

Instead of pure 4,4'-diaminodicyclohexylmethane it is also possible to use mixtures of the position-isomeric diaminodicyclohexylmethanes, which are composed of from 70 to 99 mol % of the 4,4'-diamino isomer from 1 to 30 mol % of the 2,4'-diamino isomer from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol at 25° C.) of from 2.0 to 5.0, particularly preferably from 2.5 to 4.0.

The molding compositions according to the invention are produced by mixing components I), II) and III) and, optionally, further polymers and conventional additives in conventional mixing apparatuses (preferably in multi-cylinder mills, mixing extruders or internal kneaders).

Accordingly, the invention also provides a process for the production of the molding compositions according to the invention, wherein components I), II) and III) and, optionally, further polymers and conventional additives are mixed and compounded and extruded at elevated temperature, generally at temperatures of from 150° C. to 300° C.

During production, working up, further processing and final forming, there may be added to the molding compositions according to the invention the additives that are necessary or advantageous, for example antioxidants, UV stabilisers, peroxide destroyers, antistatics, lubricants, mold-release agents, flameproofing agents, fillers or reinforcing agents (glass fibres, carbon fibres, etc.), colourants.

Final forming may be carried out on commercial processing devices and comprises, for example, processing by injection molding, the extrusion of sheets with optional subsequent warm forming, cold forming, extrusion of pipes and profiles, processing by calendering.

In the Examples which follow, parts are always parts by weight and % are always wt. %, unless indicated otherwise.

EXAMPLES

Components

ABS Graft Polymer 1

50 parts by weight (calculated as solid) of an anionically emulsified polybutadiene latex having an average particle diameter $d_{50}$ of 119 nm and a gel content of 69 wt. %, prepared by radical seed polymerization using a polybutadiene seed latex having an average particle diameter $d_{50}$ of 48 nm, are brought to a solids content of approximately 20 wt. % by means of water, following which heating to 59° C. is carried out and 0.5 part by weight of potassium peroxodisulfate (dissolved in water) is added.

50 parts by weight of a mixture of 73 wt. % styrene, 27 wt. % acrylonitrile and 0.15 part by weight of tert-dodecylmercaptan are then metered in uniformly in the course of 6 hours and, in parallel, 1 part by weight (calculated as solid substance) of the sodium salt of a resin acid mixture (Dresinate® 731, Abieta Chemie GmbH, Gersthofen, Germany, dissolved in water that has been rendered alkaline) is metered in over a period of 6 hours. In the course of the 6 hours, the reaction temperature is raised from 59° C. to 80° C. After a two-hour secondary reaction time at 80° C., and after addition of approximately 1.0 part by weight of a phenolic antioxidant, the graft latex is coagulated with a magnesium sulfate/acetic acid mixture and, after washing with water, the resulting moist powder is dried at 70° C.

ABS Graft Polymer 2

60 parts by weight (calculated as solid) of a polybutadiene latex having an average particle diameter $d_{50}$ of 434 nm and a gel content of 69 wt. %, prepared by agglomeration using acetic anhydride according to EP-A 7810 (Example Latex B) using the polybutadiene starting latex from Example 1 having an average particle diameter $d_{50}$ of 119 nm and a gel content of 69 wt. %, are brought to a solids content of approximately 20 wt. % by means of water, following which heating to 59° C. is carried out and 0.5 part by weight of potassium peroxodisulfate (dissolved in water) is added.

40 parts by weight of a mixture of 73 wt. % styrene, 27 wt. % acrylonitrile and 0.12 part by weight of tert-dodecylmercaptan are then metered in uniformly in the course of 6 hours and, in parallel, 1 part by weight (calculated as solid substance) of the sodium salt of a resin acid mixture (Dresinate® 731, Abieta Chemie GmbH, Gersthofen, Germany, dissolved in water that has been rendered alkaline) is metered in over a period of 6 hours. In the course of the 6 hours, the reaction temperature is raised from 59° C. to 80° C. After a two-hour secondary reaction time at 80° C., and after addition of approximately 1.0 part by weight of a phenolic antioxidant, the graft latex is coagulated with a magnesium sulfate/acetic acid mixture and, after washing with water, the resulting moist powder is dried at 70° C.

ABS Graft Polymer 3

The procedure "ABS graft polymer 2" is repeated, there being used as the graft base a polybutadiene latex having an average particle diameter $d_{50}$ of 464 nm and a gel content of 69 wt. %, prepared from the starting latex from Example 1 having $d_{50}$=119 nm and a gel content of 69 wt. % by agglomeration using acetic anhydride.

ABS Graft Polymer 4

The procedure "ABS graft polymer 2" is repeated, there being used as the graft base a polybutadiene latex having an average particle diameter $d_{50}$ of 531 nm and a gel content of 69 wt. %, prepared from the starting latex from Example 1 having $d_{50}$=119 nm and a gel content of 69 wt. % by agglomeration using acetic anhydride.

ABS Graft Polymer 5 (Comparison)

The procedure "ABS graft polymer 1" is repeated, there being used as the graft base a polybutadiene latex having an average particle diameter $d_{50}$ of 140 nm and a gel content of 90 wt. %, prepared without the use of a polybutadiene seed latex.

ABS Graft Polymer 6 (Comparison)

The procedure "ABS graft polymer 2" is repeated, there being used as the graft base a polybutadiene latex having a median particle diameter $d_{50}$ of 447 nm and a gel content of 72 wt. %, prepared without the use of a polybutadiene seed latex.

ABS Graft Polymer 7 (Comparison)

The procedure "ABS graft polymer 2" is repeated, there being used as the graft base a polybutadiene latex having an average particle diameter $d_{50}$ of 435 nm and a gel content of 80 wt. %, prepared without the use of a polybutadiene seed latex.

ABS Graft Polymer 8 (Comparison)

The procedure "ABS graft polymer 2" is repeated, there being used as the graft base a polybutadiene latex having an average particle diameter $d_{50}$ of 429 nm and a gel content of 69 wt. %, prepared without the use of a polybutadiene seed latex.

ABS Graft Polymer 9

The procedure "ABS graft polymer 1" is repeated, there being used a polybutadiene latex having a median particle diameter $d_{50}$ of 40 nm and a polybutadiene latex based thereon having a median particle diameter $d_{50}$ of 123 nm and a gel content of 82 wt. %.

ABS Graft Polymer 10

The procedure "ABS graft polymer 2" is repeated, the polybutadiene latex from Example 9 having an average particle diameter $d_{50}$ of 123 nm and a gel content of 82 wt. % being used as the starting latex for the agglomeration. The resulting polybutadiene latex used for the preparation of the graft polymer has an average particle diameter $d_{50}$ of 458 nm and a gel content of 82 wt. %.

ABS Graft Polymer 11

The procedure "ABS graft polymer 10" is repeated, there being used as the graft base a polybutadiene latex having an average particle diameter $d_{50}$ of 495 nm and a gel content of 82 wt. %, prepared by agglomeration according to the procedure "ABS graft polymer 2" using the polybutadiene latex from Example 9 as the starting latex ($d_{50}$=123 nm).

ABS Graft Polymer 12

The procedure "ABS graft polymer 10" is repeated, there being used as the graft base a polybutadiene latex having an average particle diameter $d_{50}$ of 432 nm and a gel content of 78 wt. %, prepared by agglomeration according to the procedure "ABS graft polymer 2" using a polybutadiene latex having an average particle diameter $d_{50}$ of 126 nm (prepared by seed polymerization using a polybutadiene latex having an average particle diameter $d_{50}$ of 40 nm) and a gel content of 78 wt. %.

ABS Graft Polymer 13

The procedure "ABS graft polymer 10" is repeated, there being used as the graft base a polybutadiene latex having an average particle diameter $d_{50}$ of 443 nm and a gel content of 78 wt. %, prepared by agglomeration according to the procedure "ABS graft polymer 2" using a polybutadiene latex having an average particle diameter $d_{50}$ of 126 nm (prepared by seed polymerization using a polybutadiene latex having an average particle diameter $d_{50}$ of 40 nm) and a gel content of 78 wt. %.

Resin Component

Random styrene/acrylonitrile copolymer (styrene:acrylonitrile weight ratio 72:28) having a $\overline{M}_W$ of approximately 85,000 and a heterogeneity $u=\overline{M}_W/\overline{M}_n-1 \leq 2$, obtained by radical solution polymerization.

Molding Compositions

The above-described polymer components in the amounts indicated in Table 1, 2 parts by weight of ethylenediaminebisstearylamide and 0.1 part by weight of a silicone oil are mixed in an internal kneader and, after granulation, processed to test rods and to a flat sheet (for evaluation of the surface).

The following data are determined:

Notched bar impact strength at room temperature (akRT) and at −40° C. (ak −40° C.) according to ISO 180/1A (unit: kJ/m2), indentation hardness (Hc) according to DIN 53 456 (unit: N/mm2), thermoplastic flowability (MVI) according to DIN 53 735 U (unit: cm3/10 min), and surface gloss according to DIN 67 530 at an angle of reflection of 20° (reflectometer value).

It will be seen from the Examples (test data see Table 2) that the products according to the invention exhibit very narrow ranges of variability of their most important properties (especially strength and processability). In addition, the molding compositions according to the invention exhibit very high gloss values (likewise with a small range of variability).

Although the comparison products exhibit similar absolute values for the tested properties, the ranges of variability are markedly greater.

TABLE 1

Composition of the molding compositions

| Example | ABS graft polymer | | | | | | | | | | | | | Resin component (parts by weight) |
|---|---|---|---|---|---|---|---|---|---|---|---|---|---|---|
| | 1 (parts by wt.) | 2 (parts by wt.) | 3 (parts by wt.) | 4 (parts by wt.) | 5 (parts by wt.) | 6 (parts by wt.) | 7 (parts by wt.) | 8 (parts by wt.) | 9 (parts by wt.) | 10 (parts by wt.) | 11 (parts by wt.) | 12 (parts by wt.) | 13 (parts by wt.) | |
| 1 | 15 | 15 | — | — | — | — | — | — | — | — | — | — | — | 70 |
| 2 | 15 | — | 15 | — | — | — | — | — | — | — | — | — | — | 70 |
| 3 | 15 | — | — | 15 | — | — | — | — | — | — | — | — | — | 70 |
| 4 (comp.) | — | — | — | — | 15 | 15 | — | — | — | — | — | — | — | 70 |
| 5 (comp.) | — | — | — | — | 15 | — | 15 | — | — | — | — | — | — | 70 |
| 6 (comp.) | — | — | — | — | 15 | — | — | 15 | — | — | — | — | — | 70 |
| 7 | — | — | — | — | — | — | — | — | — | 15 | 15 | — | — | 70 |
| 8 | — | — | — | — | — | — | — | — | — | 15 | — | 15 | — | 70 |
| 9 | — | — | — | — | — | — | — | — | — | 15 | — | — | 15 | 70 |
| 10 | — | — | — | — | — | — | — | — | — | 15 | — | — | — | 70 |

TABLE 2

Test data of the molding compositions

| Example | akRT (kJ/m2) | ak-40° C. (kJ/m2) | Hc (N/mm2) | MVI (cm3/10 min) | Degree of gloss |
|---|---|---|---|---|---|
| 1 | 16.9 | 8.6 | 108 | 41.4 | 94 |
| 2 | 17.6 | 8.5 | 106 | 41.4 | 93 |
| 3 | 17.6 | 8.6 | 107 | 40.8 | 94 |
| 4 (comp.) | 19.9 | 9.1 | 103 | 36.6 | 91 |
| 5 (comp.) | 18.6 | 8.0 | 104 | 34.2 | 90 |
| 6 (comp.) | 17.1 | 7.4 | 105 | 33.0 | 94 |
| 7 | 17.2 | 9.1 | 108 | 41.0 | 94 |
| 8 | 17.4 | 9.1 | 107 | 41.3 | 93 |
| 9 | 17.5 | 8.9 | 109 | 40.8 | 93 |
| 10 | 17.5 | 8.8 | 107 | 40.9 | 93 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
   I) a graft rubber polymer produced by emulsion polymerization of a first mixture containing styrene and acrylonitrile in a weight ratio of 95:5 to 50:50 therebetween, in the presence of butadiene polymer latex (A) having a median particle diameter (d50) of 80 to 220 nm, determined by ultracentrifuge measurement,
   II) a graft rubber polymer produced by emulsion polymerization of a second mixture containing styrene and acrylonitrile in a weight ratio of 95:5 to 50:50 therebetween in the presence of butadiene polymer latex (B) having a median particle diameter (d50) of 350 to 650 nm, determined by ultracentrifuge measurement, III) a rubber-free copolymer polymerized of a third mixture that contains styrene and acrylonitrile in a weight ratio of from 95:5 to 50:50 therebetween, wherein butadiene polymer latex (A) is the product of seed polymerization in which seed is butadiene polymer latex having a median particle diameter of 10 to 100 nm, determined by ultracentrifuge measurement, and the butadiene polymer latex (B) is the product of agglomeration in which butadiene polymer latex (A) is the starting latex.

2. The composition according to claim 1 wherein (A) has a median particle diameter (d50) of from 90 to 210 nm, determined by ultracentrifuge measurement, (B) has a median particle diameter (d50) of from 360 to 600 nm, determined by ultracentrifuge measurement, and butadiene polymer seed latex has a median particle diameter of from 20 to 90 nm, determined by ultracentrifuge measurement.

3. The composition of claim 1 additionally containing at least one resin selected from the group consisting of aromatic polycarbonate, aromatic polyester carbonate, polyester and polyamide.

4. The composition according to claim 1 wherein the production of the graft rubber polymer, both occurrences, 55 to 90 wt. % of the total monomers are fed in to the reaction during the first half of the total monomer metering time, and the remaining amount of monomers is metered in the second half of the total monomer metering time.

5. The composition according to claim 1 wherein the production of the graft rubber polymer, both occurrences, a temperature difference of at least 15° C. is maintained between the beginning and the end of the graft reaction.

6. A process for producing the composition according to claim 1 comprising preparing said butadiene polymer latex (A) by seed polymerization of butadiene polymer seed latex having a median particle diameter of from 10 to 100 nm, determined by ultracentrifuge measurement, and preparing the butadiene polymer latex (B) by agglomerating butadiene polymer latex (A).

7. The process for producing the composition according to claim 6 wherein agglomerating is carried out by acetic anhydride.

8. The process for producing the composition according to claim 6 comprising mixing said I), with II) and with III) to form a compound and extruding said compound at an elevated temperature.

9. A method of using the composition of claim 1 comprising producing a molded article.

10. A molded article comprising the composition of claim 1.

11. The composition of claim 1 wherein the first mixture further contains at least one member selected from the group consisting of α-methylstyrene, methyl methacrylate and N-phenylmaleimide.

12. The composition of claim 1 wherein the second mixture further contains at least one member selected from the group consisting of α-methylstyrene, methyl methacrylate and N-phenylmaleimide.

13. The composition of claim 1 wherein the third mixture further contains at least one member selected from the group consisting of α-methylstyrene, methyl methacrylate and N-phenylmaleimide.

* * * * *